United States Patent
Parsons

[15] 3,669,462  
[45] June 13, 1972

[54] THREE AND FOUR LEAF MACHINE TOOL COLLETS

[72] Inventor: Hubert J. Parsons, Horseheads, N.Y.

[73] Assignee: Hardinge Brothers Inc., Elmira, N.Y.

[22] Filed: April 3, 1970

[21] Appl. No.: 25,456

[52] U.S. Cl. .................................................. 279/51, 279/1 Q
[51] Int. Cl. ............................................................ B23b 31/20
[58] Field of Search .................... 279/1 Q, 1 ME, 41, 42, 43, 279/46, 50, 51, 52, 53

[56] References Cited

UNITED STATES PATENTS

| | | | |
|---|---|---|---|
| 2,856,192 | 10/1958 | Schuster et al. | 279/43 X |
| 2,735,688 | 2/1956 | Duchesneau et al. | 279/53 |
| 2,842,839 | 7/1958 | Benjamin et al. | 279/51 UX |
| 1,756,258 | 4/1930 | O'Connell | 279/41 |

FOREIGN PATENTS OR APPLICATIONS 482,766   4/1938   Great Britain ........................ 279/1 Q

*Primary Examiner*—Andrew R. Juhasz
*Assistant Examiner*—James F. Coan
*Attorney*—Shlesinger, Arkwright & Garvey

[57] ABSTRACT

A machine tool collet of the three or four leaf type including a cylindrical body having a longitudinal axis, a collet head at the outer end of the body, a plurality of radial slots extending parallel to the longitudinal axis for dividing the body and the head into a plurality of arcuate segments, the slots having a narrow forward portion and an enlarged portion rearwardly of the forward portion, each of the arcuate segments adjacent the enlarged portion of the slots comprising an arcuate distance of approximately 50°. Alternatively, if the arcuate segments are machined to be substantially flat, then the degree of arc of the segments may be as much as approximately 70°.

12 Claims, 19 Drawing Figures

INVENTOR.
Hubert J. Parsons

INVENTOR.
Hubert J. Parsons
BY
Shlesinger, Arkwright & Garvey
ATTORNEYS

INVENTOR.
Hubert J. Parsons

THREE AND FOUR LEAF MACHINE TOOL COLLETS

This invention relates to a machine tool collet and more particularly a machine tool collet which grips the work piece more uniformly and securely than prior art collets.

Prior art collets are typified by a body having threads at one end thereof for attachment to a draw tube, and a work gripping portion at the other end of the collet. The collet head usually has a cylindrical inner surface, and a tapered outer surface, the tapered outer surface being arranged for contact with a correspondingly tapered portion of the spindle. When the draw tube is pulled back, the tapered surfaces coact to exert a radially inward force through the collet jaws onto the work piece, securely holding the same.

One of the difficulties of prior art collets has been that the nature of the body of the collet is such that when the collet jaws are forced radially inward, the internal work engaging surface tends to pivot about the solid body portion, and grips the work piece primarily at the front portion of the collet. Thus, the area of contact between the work gripping jaws and the work piece is quite small, and the work gripping force is reduced. This effect becomes very pronounced if the diameter of the work pieces have variation, especially in the direction of being smaller than the hole in the collet.

Several attempts have been made to overcome this problem particularly by use of multi-part collet heads which would tend to seat squarely on the work piece, and afford a greater area of contact with the work piece. However, limitations of cost and manufacturing difficulties have restricted the use of this type of collet.

In addition to lower gripping force from the collet to the work piece, unusual wear occurs at the outer most portion.

Accordingly, a primary object of this invention is to provide a collet which applies an improved gripping force to more securely support the work pieces when their diameters vary in size.

Still another object of this invention is to provide a collet which has work engaging surfaces which contact the work piece more uniformly throughout the work engaging surfaces when variations are present in diameters of work pieces.

Still a further object of this invention is to provide a collet which reduces the wear on the work engaging surfaces of the collet.

Yet another object of this invention is to provide a collet of the multileaf type which is more resistant to fatigue than prior art collets.

A still further object of this invention is to provide a collet which is readily manufactured.

These and other objects and advantages of this invention will become apparent when considered in light of the following description and claims when taken with the drawings in which:

FIGS. 1 THROUGH 4

Figure 1:
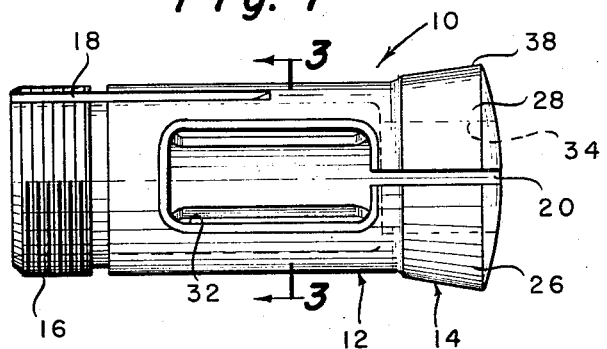
FIG. 1 is a side elevation of one embodiment of a collet according to this invention.
Figure 2:
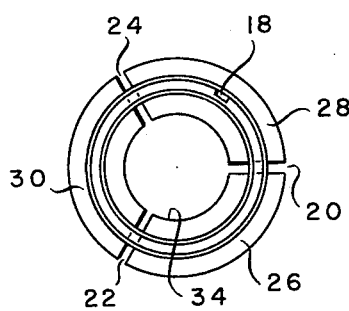
FIG. 2 is a rear elevation view of FIG. 1.
Figure 3:
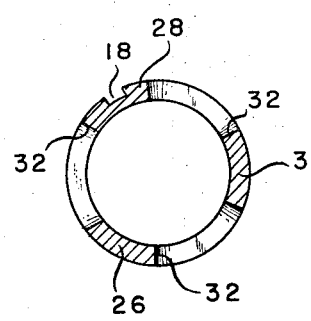
FIG. 3 is a cross sectional view along lines 3—3 of FIG. 1 and viewed in the direction of the arrows.
Figure 4:
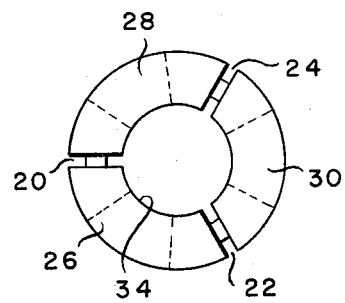
FIG. 4 is a front elevation of the embodiment of FIG. 1.

Referring now to FIG. 1, a collet generally designated 10 is shown having a body portion 12, a head portion 14, and a threaded portion 16 which is secured to the draw tube (not shown) of a lathe. A key way 18 is shown, and is utilized in the conventional manner with a key (not shown) to prevent relative rotation of the collet 10 and the draw tube (not shown) when in use.

Figure 16:
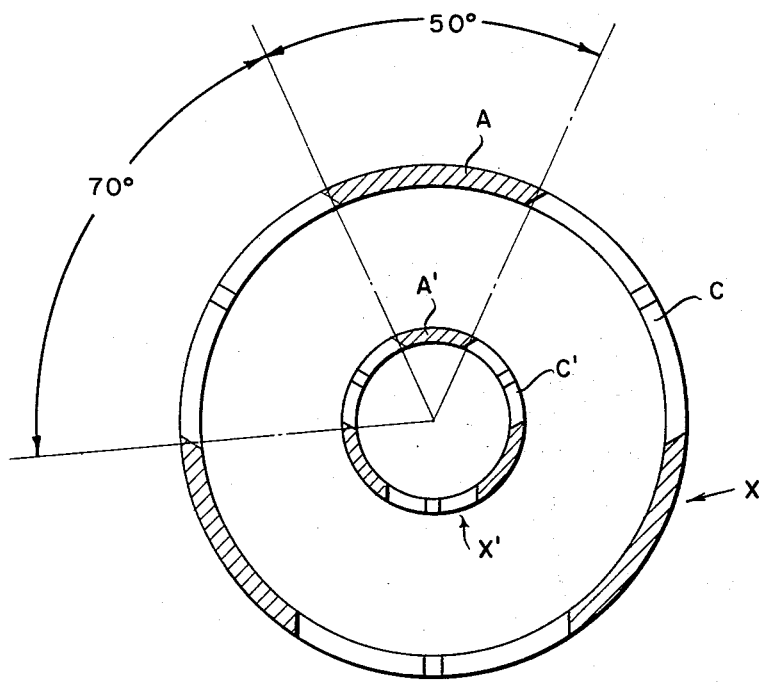
FIG. 16 is a schematic view showing in section representative sizes of three leaf collets of this invention, showing in concentric relationship the constant arc of the leaves and removed areas for different sizes.

The body portion 12 and the head portion 14 are divided by a plurality of radially arranged, longitudinally extending slots 20, 22 and 24 into a three leaf configuration, the leaves being designated 26, 28 and 30. Through the head portion 14 of the collet, the slots 20, 22 and 24 are comparatively narrow. However, upon passing into the body portion 12 of the collet, the slots are enlarged substantially as at 32. The size of the enlarged portion 32 of the slot is dictated by the number of leaves of the collet, the invention being generally confined to three and four leaf collets. The leaves have an arcuate distance of approximately 50° as is best seen in FIGS. 16 and 17.

Figure 17:
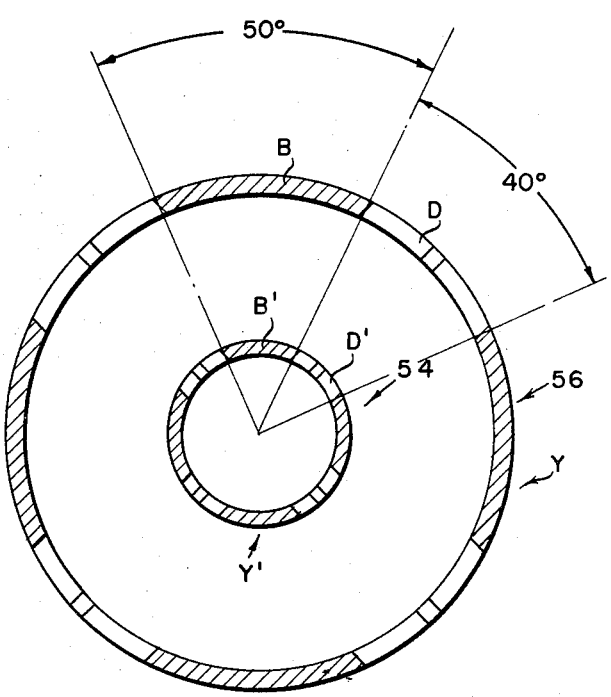
FIG. 17 is a schematic view showing in section representative sizes of four leaf collets of this invention, showing in concentric relationship the constant arc of the leaves and removed areas for different sizes.

For three-leaf collets, X and X', the arcuate distance of the cutouts C and C' is approximately 70°, and each of the leaves A and A' comprising arcuate distances of approximately 50°, As best shown in FIG. 17 for four leaf collets, Y and Y', the arcuate distance of the cutouts D and D' is approximately 40°, and each of the leaves B and B' comprise arcuate distances of approximately 50°.

Figure 18:
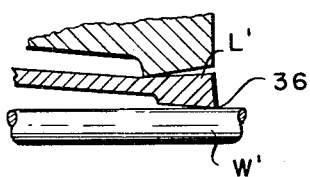
FIG. 18 is a fragmentary view showing diagrammatically the manner in which prior art collets grip work pieces when they are somewhat smaller than the hole in the collet.
Figure 19:
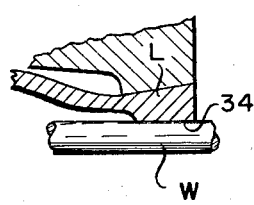
FIG. 19 is a fragmentary view showing diagrammatically the manner in which collets of the present invention grip a work piece when it is somewhat smaller than the hole in the collet.

With approximately 50° of leaf remaining adjacent the enlarged portions 32 of the slots, the proper longitudinal bending of the leaves 26, 28 and 30 is obtained so as to obtain the proper gripping of the work piece (not shown) by the work engaging surface 34. The nature of the bending which occurs is best seen in FIG. 19 where a work piece W and a collet leaf L are shown. Here it is seen that the work engaging portion 34 of the leaf L contacts the slightly undersize work piece W over the entire length of the surface 34. By comparison, in FIG. 18 showing the prior art type of collets, since the work piece W' is contacted by the leaf L' only at the point designated 36, it is readily apparent that the work will not be held as securely and the leaf will tend to wear at point 36. The type of bending shown in FIG. 18 is caused by the fact that the leaves of prior art collets are usually on the order of 75° or greater of arcuate distance. With 75° of leaf, the leaf is too rigid to bend in such a manner as to grip the work over the entire inner length of the collet jaws when the work piece is undersize.

When the leaf is cut out to leave approximately 50° of arcuate distance remaining adjacent the slots 32, longitudinal bending of each leaf 26, 28 and 30 is permitted adjacent the slots 32, and when the tapered portion 38 of the head 14 contacts the lathe spindle (not shown), the work engaging surface 34 contacts the work piece throughout its length. It has been found that advantageously approximately 50° of arc of the leaf is necessary; 55° or more creates too much rigidity and insufficient flex and 46° or less too little strength.

Figure 15:
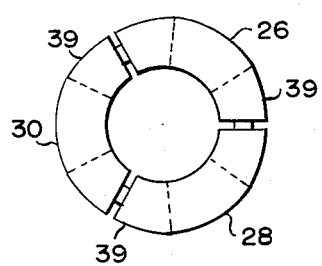
FIG. 15 is a front elevation of the embodiment of FIG. 13.

When the collet is used on work pieces having considerable variation in diameter, it is desirable to cam grind the tapered portion 38 of the collet head 14, and this also serves to assist in obtaining the proper bending action of the leaves 26, 28 and 30 for improved gripping of a work piece. The cam grinding is best seen in FIG. 15, and reference numerals 39 designate the cam ground areas on the tapered portions 38.

FIG. 1 discloses an embodiment of this invention wherein the enlarged portion 32 of the slots is cut in the body portion 12 of the collet by means of a tapered cutter. Additionally, the enlarged portion 32 in this embodiment is of a substantially rectangular configuration.

FIGS. 5 THROUGH 15

Figure 5:
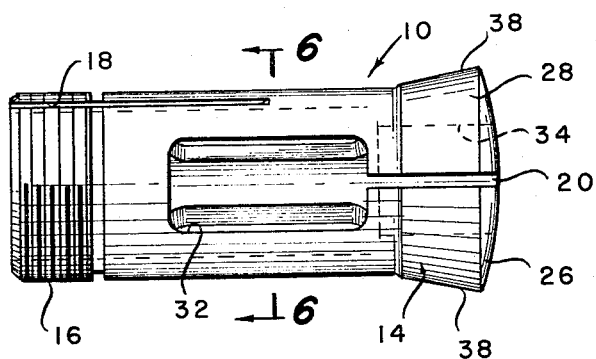
FIG. 5 is a side elevation of another embodiment of this invention.
Figure 6:
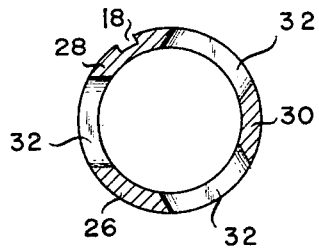
FIG. 6 is a cross sectional view along lines 6—6 of FIG. 5 and viewed in the direction of the arrows.

FIGS. 5 and 6 disclose an alternate embodiment wherein a straight cutter is used in cutting the enlarged portions of the slots 32. Again, the cutout 32 is of substantially rectangular configuration. As in FIG. 1, the cutouts 32 comprise approximately 70° of arcuate distance, and the remaining leaf portions are approximately 50°.

Figure 7:
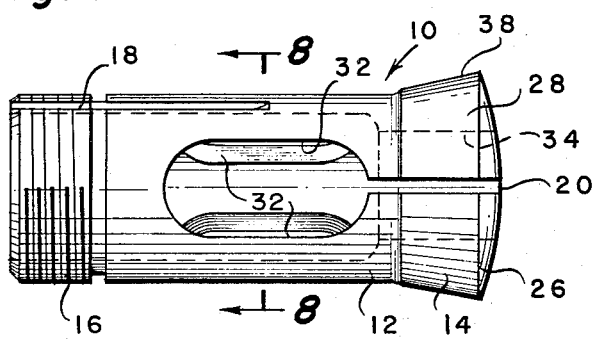
FIG. 7 is a side elevation of still another embodiment of this invention.
Figure 8:
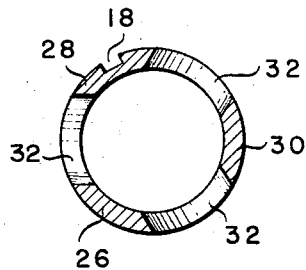
FIG. 8 is a cross sectional view along lines 8—8 of FIG. 7 and viewed in the direction of the arrows.

Referring to FIGS. 7 and 8, a further embodiment of this invention is shown wherein the cutout portions 32 are substantially of oval configuration, and are produced with a straight cutter. In some applications, the use of the oval cutout 32 is preferred to reduce fatigue at the rear portion of the cutout 32.

Figure 9:
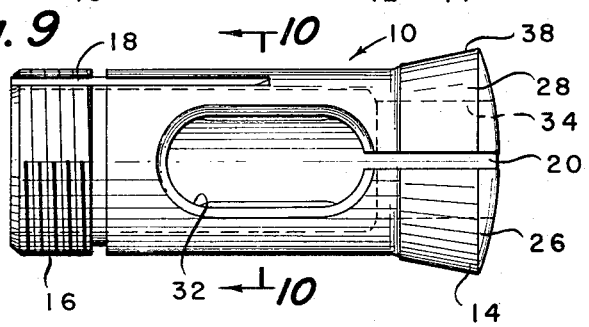
FIG. 9 is a side elevation of another embodiment of this invention.
Figure 10:
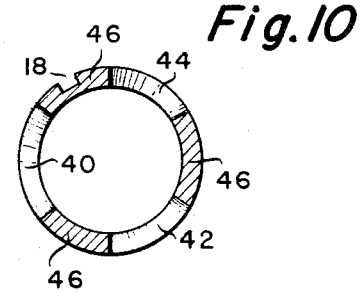
FIG. 10 is a cross sectional view along lines 10—10 of FIG. 9 and viewed in the direction of the arrows.

FIGS. 9 and 10 disclose embodiments similar to FIGS. 7 and 8 in that the cutouts 32 are of generally oval configuration. However, in this embodiment, a tapered cutter is used to produce the cutouts 32. Again, however, the cutout portions are approximately 70° arcuate distance, while the remaining leaf portions are approximately 50° each.

Figure 11:
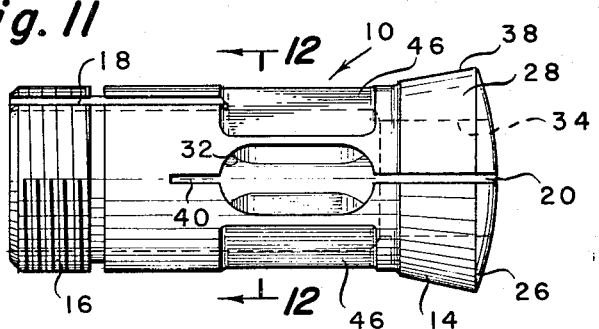
FIG. 11 is a side elevation of another embodiment of this invention.
Figure 12:
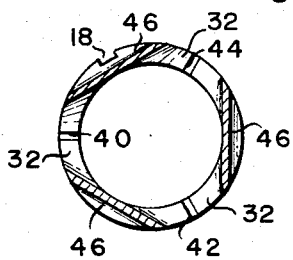
FIG. 12 is a cross sectional view along lines 12—12 of FIG. 11 and viewed in the direction of the arrows.

FIGS. 11 and 12 disclose another embodiment of this invention which is somewhat similar to the embodiment of FIGS. 7 and 8. In FIGS. 11 and 12, a substantially oval cutout 32 is formed being produced with a straight cutter. The slots 20, 22 and 24 are continued rearwardly of cutouts 32 as shown at 40, 42 and 44. These extensions 40, 42 and 44 serve to permit a shorter cutout 32, and yet still permit the required bending in the leaves 26, 28 and 30. The inner and outer surfaces of leaves 26, 28 and 30 are machined as at 46 to produce a leaf portion which is substantially flat and thinner than the remainder of the body portion as best shown in FIG. 12. This permits easier flexing and bending within the leaves 26, 28 and 30 and permits as much as approximately 70° of arc in the leaf. As in the previous embodiments, the cutouts may comprise an arcuate distance of approximately 50°–70°, while the remaining leaf portion has an arcuate distance of approximately 70°–50°.

Figure 13:
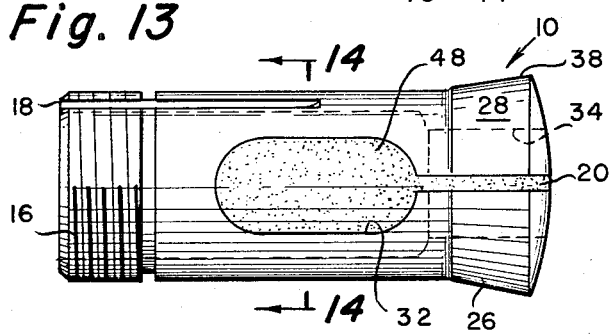
FIG. 13 is a side elevation of still another embodiment of this invention.
Figure 14:
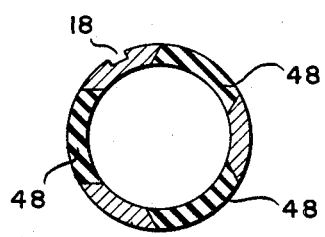
FIG. 14 is a cross sectional view along lines 14—14 of FIG. 13 and viewed in the direction of the arrows.

Still a further embodiment of this invention is illustrated in FIGS. 13, 14, and 15. The collet shown in these figures is substantially identical to that of FIGS. 7 and 8, however, in the embodiment of FIGS. 13, 14, and 15, the cutout portions 32 are filled with an elastomeric material 48. The elastomer 48 serves as a seal against chips and particles entering into the body of the collet. The elastomeric material used should be sufficiently resilient to permit the desired flexing of the leaves 26, 28, and 30 as previously described, and the material should be resistant to oils. One suitable material for this seal would be a synthetic rubber such as Neoprene. It is to be understood that the seal shown in FIGS. 13–15 could be utilized with any of the embodiments of this invention.

FIG. 16 illustrates the manner in which the principles of this invention may be applied to collets of different sizes. This figure is a schematic showing a section similar to FIGS. 3, 6, 8, 10, 12, and 14 through the cutout portions of the body 12 of the collet. It is seen that whether the collet be of relatively small size as designated X' or of comparatively large size designated X, the arcuate distance of the leaves A or A' is approximately 50° while the arcuate distance of the cutouts C or C' is approximately 70°. This would be the case for all three leaf collets regardless of the diameter of the collet.

FIG. 17 shows an illustration similar to FIG. 16, however, in FIG. 17, a pair of four leaf collets are illustrated. Both the small collet Y' and the large collet Y have leaf portions B and B' which are approximately 50° while the cutout portions D and D' comprise arcuate distances of approximately 40°.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:
1. A machine tool collet including:
   a. a cylindrical body having a longitudinal axis,
   b. a collet head at the outer end of said body,
   c. at least three radial slots extending parallel to said longitudinal axis for dividing said body and said head into a plurality of segments,
   d. said slots having a narrow forward portion and an enlarged portion adjacent said collet head and rearwardly of said forward portion,
   e. said enlarged portion being longer than said narrow portion, and
   f. each of said segments adjacent said enlarged portions of said slots comprising an arcuate distance of approximately 50°.
2. A machine tool collet as in claim 1 and wherein:
   a. said enlarged portions of said slots define cutouts in said body.
3. A machine tool collet as in claim 2 and wherein:
   a. said cutouts are substantially oval.
4. A machine tool collet as in claim 2 and wherein:
   a. said cutouts are substantially rectangular.
5. A machine tool collet as in claim 2 and including:
   a. seal means in each of said cutouts.
6. A machine tool collet as in claim 2 and wherein:
   a. said plurality of radial slots comprises three radial slots.
7. A machine tool collet as in claim 2 and wherein:
   a. said plurality of radial slots comprises four radial slots.
8. A machine tool collet as in claim 2 and wherein:
   a. said cutouts are cut on a radius.
9. A machine tool collet as in claim 2 and wherein:
   a. said cutouts are cut with a straight cutter.
10. A machine tool collet as in claim 2 and wherein:
    a. said cutouts are cut with an angled cutter.
11. A machine tool collet including:
    a. a cylindrical body having a longitudinal axis,
    b. a collet head at the outer end of said body,
    c. at least three radial slots extending parallel to said longitudinal axis for dividing said body and said head into a plurality of segments having inner and outer surfaces,
    d. said slots having narrow forward portions and enlarged portions adjacent said collet head and rearwardly of said forward portions,
    e. said enlarged portions being longer than said narrow portion,
    f. each of said segments adjacent said enlarged portions of said slots being machined substantially flat on said outer surface of each of said segments, and
    g. each of said segments adjacent said enlarged portions of said slots comprising an arcuate distance of approximately 70°.
12. A machine tool collet as in claim 11 and wherein:
    a. said inner surface of each of said segments adjacent said enlarged portions of said slots is machined substantially flat.

* * * * *